(12) United States Patent
Caputo et al.

(10) Patent No.: US 8,271,486 B2
(45) Date of Patent: Sep. 18, 2012

(54) SYSTEM AND METHOD FOR SEARCHING A BOOKMARK AND TAG DATABASE FOR RELEVANT BOOKMARKS

(75) Inventors: Rocco Caputo, Davie, FL (US); Joshua Schachter, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 86 days.

(21) Appl. No.: 11/495,825

(22) Filed: Jul. 28, 2006

(65) Prior Publication Data

US 2008/0027914 A1    Jan. 31, 2008

(51) Int. Cl.
*G06F 7/00* (2006.01)
*G06F 17/30* (2006.01)

(52) U.S. Cl. .......................... 707/732; 707/706
(58) Field of Classification Search .............. 707/3, 706, 707/732

See application file for complete search history.

(56) References Cited

U.S. PATENT DOCUMENTS

| | | | |
|---|---|---|---|
| 6,321,228 B1 * | 11/2001 | Crandall et al. | 1/1 |
| 6,631,496 B1 * | 10/2003 | Li et al. | 715/200 |
| 7,099,860 B1 * | 8/2006 | Liu et al. | 1/1 |
| 7,526,472 B2 * | 4/2009 | Heidloff et al. | 1/1 |
| 2006/0080305 A1 * | 4/2006 | Dill et al. | 707/3 |
| 2006/0242554 A1 * | 10/2006 | Gerace et al. | 715/501.1 |
| 2006/0265381 A1 * | 11/2006 | Altaf et al. | 707/10 |

* cited by examiner

*Primary Examiner* — Charles Lu
(74) *Attorney, Agent, or Firm* — Seth H. Ostrow; Ostrow Kaufman LLP

(57) ABSTRACT

A method comprises receiving a search request to search a bookmark package database storing bookmarks and tag information, e.g., user-generated keywords; using the search request to search the tag information in the bookmark package database to locate relevant bookmarks and to generate search results; and presenting the search results to a user. The search results may identify user-specific relevant bookmarks, and/or relevant bookmarks regardless of the creator. The method may include determining related terms and enabling selection of the related terms to initiate additional searching. The method may include generating a relevance value based on keyword order, meta-information type, number of bookmarks to a given content item, number of hits on a given bookmark, time of last bookmarking to a given content item, and/or content analysis. Search result organization may be based on the relevance values. The bookmark package database may further store automatically generated and user-generated meta-information.

17 Claims, 6 Drawing Sheets

| del.icio.us / search | popular \| recent |
|---|---| your favorites\| your network \| inbox \| links for you \| post logged in as msockol\|settings \| logout \| help — 605

Search results for uspto     610 —[uspto] [search]

Your items — 615
No results found

Everyone's items — 620
showing 1 - 10 of 429

« previous \| next »

Kids - Trademark Soundex - USPTO save this
to audio mp3 trademark download culture ... saved by 54 other people

Patents - Patent Full-Text and Full-Page Image Databases save this
to patents patent search reference uspto ... saved by 224 other people

United States Patent and Trademark Office Home Page save this
to patents patent government trademarks reference ... saved by 336 other people

Trademarks save this
to trademark trademarks reference business patent ... saved by 80 other people

Questions and Answers - USPTO-USPTO save this
... saved by 2 other people

Small business - Small Business and Intellectual Property - US Patent and Trademark Office - USPTO Stopfakes.gov save this
to business ... saved by 5 other people

IP Newsflash - hourly updated patent news, trademark headlines, intellectual property stories as well as related decisions, caselaw, notices of the offices (USPTO, EPO, DPMA, BGH, US Supreme Court, ...), books, patent family, patentfamilie, patentfamilien save this
to ip news patents patent blogs ... saved by 9 other people

Patents - Patent Full-Text and Full-Page Image Databases save this
to patent patents reference search database ... saved by 36 other people

USPTO Patent and Application Searches Via RSS save this
to rss ... saved by 4 other people

GROKLAW save this
to patent patents uspto ... saved by 4 other people

« previous \| next »

625 — common tags
patent
patents
search
uspto
ip
law
business
reference
software
google
opensource
trademark
blog
design
microsoft
technology
government
innovation
research
rss
science
tools
trademarks
blogs
database

SYSTEM AND METHOD FOR SEARCHING A BOOKMARK AND TAG DATABASE FOR RELEVANT BOOKMARKS

COPYRIGHT AND TRADEMARK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to web browsing, and more particularly provides a system and method for searching a bookmark and tag database for relevant bookmarks.

BACKGROUND

A number of techniques are known to those of skill in the art for saving references to content items. One example is a bookmark (favorite) available by most popular web browsers. A user utilizes a web browser to view content items available over a network, e.g., the Internet. When the user navigates to a content item of possible future interest, the user saves a bookmark to the content item in the web browser. For example, where a given content item is identified by an address, e.g., a URL, the web browser saves a local reference to the content item by maintaining the URL of the content item and a label to identify the content item. When the user wishes to subsequently view the content item, the user may select the locally saved bookmark, causing the web browser to navigate to the address associated with the bookmark to access the content item.

Stored bookmarks are generally available only locally to the user that originally saved the bookmark. What are needed are mechanisms for storing bookmarks for local and/or public use and mechanisms for enabling easy retrieval of those stored bookmarks.

SUMMARY

In accordance with one embodiment, the present invention provides a method, comprising receiving a search request to search a bookmark package database, the bookmark package database storing bookmarks and tag information; using the search request to search the tag information in the bookmark package database to locate relevant bookmarks and to generate search results; and presenting the search results to a user. The search request may include a set of keywords. The tag information may include user-selected tags. The method may further include identifying the relevant bookmarks that the user previously saved. The method may further include identifying the relevant bookmarks regardless of the user that created them. The method may further include generating a list of related terms and enabling the user to select from the related terms to initiate additional searching of the bookmark package database. The method may further include generating a relevance value for each of the bookmarks. The relevance value may be based on at least one of keyword order, type of meta-information, number of bookmarks to a given content item, number of hits on a given bookmark, time of the last post of a bookmark to a given content item, and content analysis. The order of the search results may be based on the relevance values of the bookmarks. The bookmark package database may further store automatically generated meta-information and user-generated meta-information.

According to another embodiment, the present invention provides a system, comprising a search manager for receiving a search request to search a bookmark package database, the bookmark package database storing bookmarks and tag information, and for presenting search results to a user; and a search module coupled to the search manager for using the search request to search the tag information in the bookmark package database to locate relevant bookmarks and to generate the search results. The search request may include a set of keywords. The tag information may include user-selected tags. The system may further include a user-focused search module for identifying the relevant bookmarks that the user previously saved. The system may further include an entire collection search module for identifying the relevant bookmarks regardless of the user that created them. The system may further include a related terms search module for generating a list of related terms, wherein the search manager is configured to enable the user to select from the related terms to initiate additional searching of the bookmark package database. The system may further include a relevance value generator for generating a relevance value for each of the bookmarks. The relevance value generator may be configured to generate the relevance value based on at least one of keyword order, type of meta-information, number of bookmarks to a given content item, number of hits on a given bookmark, time of the last post of a bookmark to a given content item, and content analysis. The search manager may be configured to present the search results based on the relevance values of the bookmarks. The bookmark package database may further store automatically generated meta-information and user-generated meta-information.

In yet another embodiment, the present invention provides a system, comprising means for receiving a search request to search a bookmark package database, the bookmark package database storing bookmarks and tag information; means for using the search request to search the tag information in the bookmark package database to locate relevant bookmarks and to generate search results; and means for presenting the search results to a user.

BRIEF DESCRIPTION OF THE DRAWINGS

FIG. 6 illustrates an example user interface for displaying the results of a search of a bookmark package database, in accordance with an embodiment of the present invention.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

Figure 1:
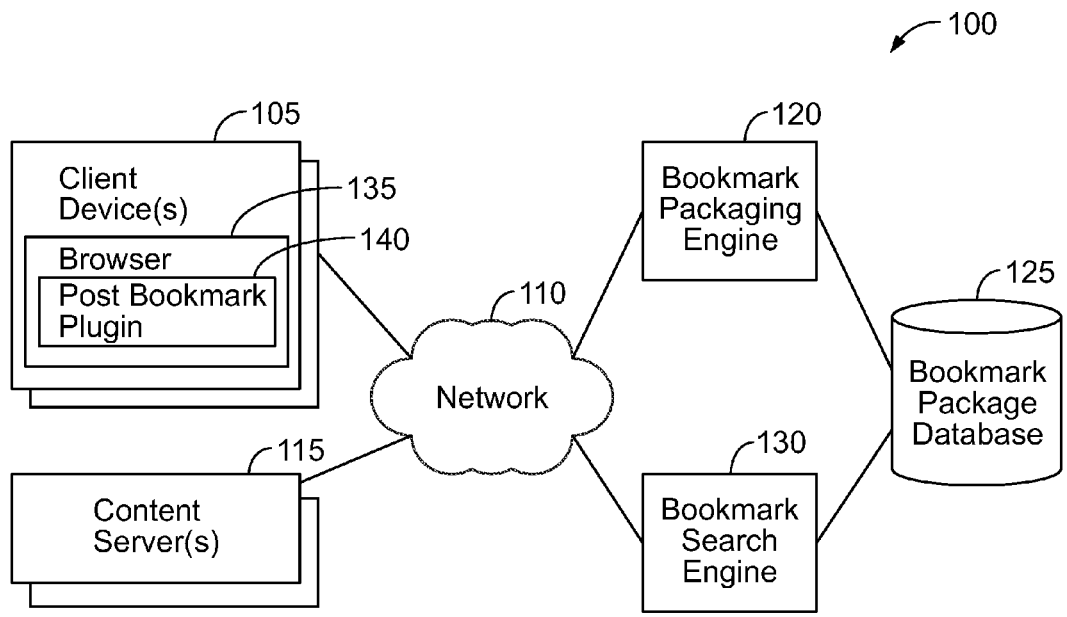
FIG. 1 is a block diagram of a network system implementing bookmark packaging and searching, in accordance with an embodiment of the present invention.

FIG. 1 is a block diagram of a network system 100 implementing bookmark packaging, storing and searching, in accordance with an embodiment of the present invention. Network system 100 includes client devices 105 coupled via a network 110, e.g., the Internet, to content servers 115. A bookmark packaging engine 120 is coupled to the network 110 to enable users of the client devices 105 to package and store bookmarks to content items deemed interesting to the user in a bookmark package database 125, which is coupled to the bookmark packaging engine 120. A bookmark search engine 130 is also coupled to the network 110 to enable users of the client devices 105 to search the bookmark package database 125, which is also coupled to the bookmark search engine 130. The bookmark packaging engine 120, the bookmark package database 125, and the bookmark search engine 130 may be operated by a single entity or different entities, on a single server or on multiple servers, etc.

A client device 105 communicates with content servers 115 to view content items. Example content items include web pages, text documents, images, audio files, video files, multimedia files, or any other form of digital content accessible over a network. A client device 105 may be a laptop computer, desktop computer, PDA, mobile phone, etc. A client device 105 may run software applications including a web browser that allows for communication with content servers 115 and presentation of the content items provided by the content servers 115 to the user of the client device 105. In one embodiment, the browser 135 is modified to include bookmark-posting functionality. Bookmark-posting functionality may be provided to the browser 135 via a post bookmark plugin 140 (as shown) or via other techniques known to those skilled in the art. The post bookmark plugin 140 may be provided to enable the user to add bookmarks and meta-information to the bookmark database 125 while browsing a web page and without first navigating to a website managed by the bookmark packaging engine 120. In another embodiment, the browser 135 does not include bookmark-posting functionality. In such case, the user may navigate to the website managed by the bookmark packaging engine 120 to enter the bookmark and meta-information.

The bookmark packaging engine 120 includes hardware, software and/or firmware to enable packaging of bookmarks and forwarding of bookmark packages to the bookmark package database 125. The bookmark packaging engine 120 provides an interface (application and/or user) to receive a bookmark request, to obtain meta-information (e.g., tags) on the bookmark, to automatically generate other meta-information on the bookmark, to combine the bookmark and meta-information to generate a "bookmark package", and to forward the bookmark package to the bookmark package database 125 for indexing and storage. An example bookmark package 300 is shown in and described with reference to FIG. 3. An example bookmark packaging form 500 for receiving a bookmark and meta-information, including tags, on a bookmark is shown in and described with reference to FIG. 5.

It will be appreciated that the bookmark packaging engine 120 may refuse to package and/or forward content items or URLs known to be bad (e.g., malicious, system damaging, irrelevant to the system's scope of operation, etc.), to package and/or forward any content items from users known to be bad (e.g., known to post bad content items, known to have a record of malicious behavior, etc.), to package and/or forward any content items without any meta-information (or specific meta-information, e.g., tags) added to it, and/or the like.

The bookmark package database 125 stores the bookmark packages (bookmarks and meta-information such as description, user notes, tags, etc.) possibly in relational database or other database format. In one embodiment, the bookmark package database 125 generates index information to enable fast and easy retrieval of bookmark packages in response to user search requests. In one embodiment, the bookmark package database 125 generates a "tag space" for each bookmark package. A tag space for a given content item includes all tags associated with that given content item. That is, the tag space for a given content item includes all tags associated with all bookmarks in the bookmark package database 125 that are associated with the given content item. For example, one or more registered users may create multiple bookmark packages for a given content item. Although the bookmarks are associated with the same content item, each may include different tag information. The tag space for the given content item includes the collection of all tags associated with all bookmark packages in the set. Accordingly, the tag space for each bookmark package associated with the same content will have the same tag space. Conversely, in one embodiment, the bookmark package database 125 may include a "bookmark space" for a given tag. That is, a bookmark space includes the set of bookmarks associated with a given tag. The bookmark package database 125 may generate other index information, e.g., description space, user notes space, groupings, categorizations, etc., to enable fast searching and more helpful search results.

It will be appreciated that the bookmark package database 125 may refuse to index and/or store content items or URLs known to be bad (e.g., malicious, system damaging, irrelevant to the system's scope of operation, etc.), to index and/or store any content items from users known to be bad (e.g., known to post bad content items, known to have a record of malicious behavior, etc.), to index and/or store any content items without any meta-information (or specific meta-information, e.g., tags) added to it, and/or the like.

The bookmark search engine 130 includes hardware, software and/or firmware to enable searching of the bookmark packages stored in the bookmark package database 125. The bookmark search engine 130 provides an interface to receive bookmark search requests from users, to conduct searches of the bookmark packages (bookmarks and meta-information) in the bookmark database 125, to generate search results, and to provide the search results to the user, possibly via the browser 135 on the client device 105. An example user interface for displaying search results is shown in and described with reference to FIG. 6.

Figure 2:
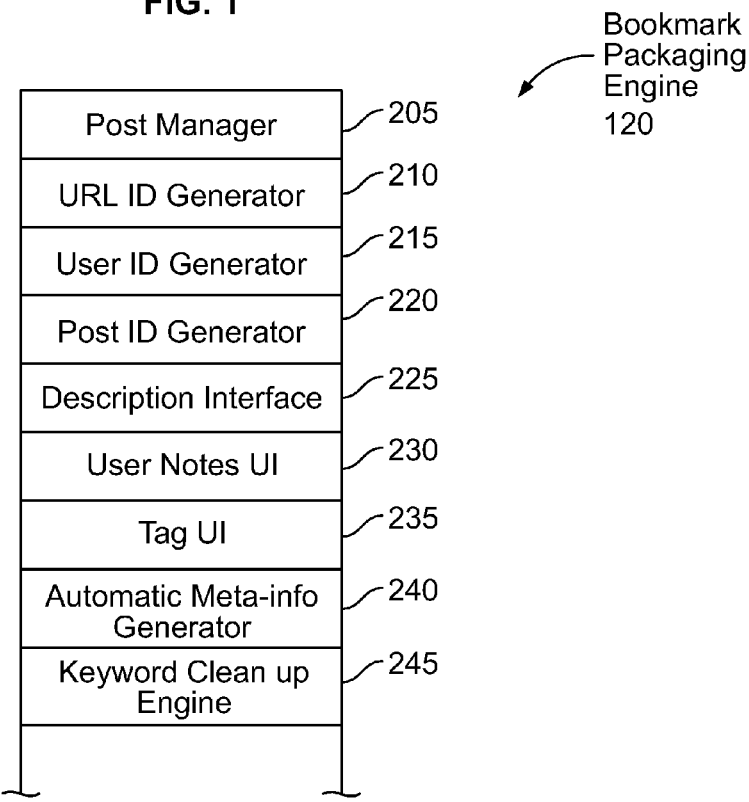
FIG. 2 is a block diagram illustrating details of a bookmark packaging engine of FIG. 1.

FIG. 2 is a block diagram illustrating details of the bookmark packaging engine 120. The bookmark packaging engine 120 includes a post manager 205, a URL ID generator 210, a user ID generator 215, a post ID generator 220, a description interface 225, a user notes UI 230, a tag UI 235, an automatic meta-information generator 240, and a keyword cleanup engine 245.

Figure 5:
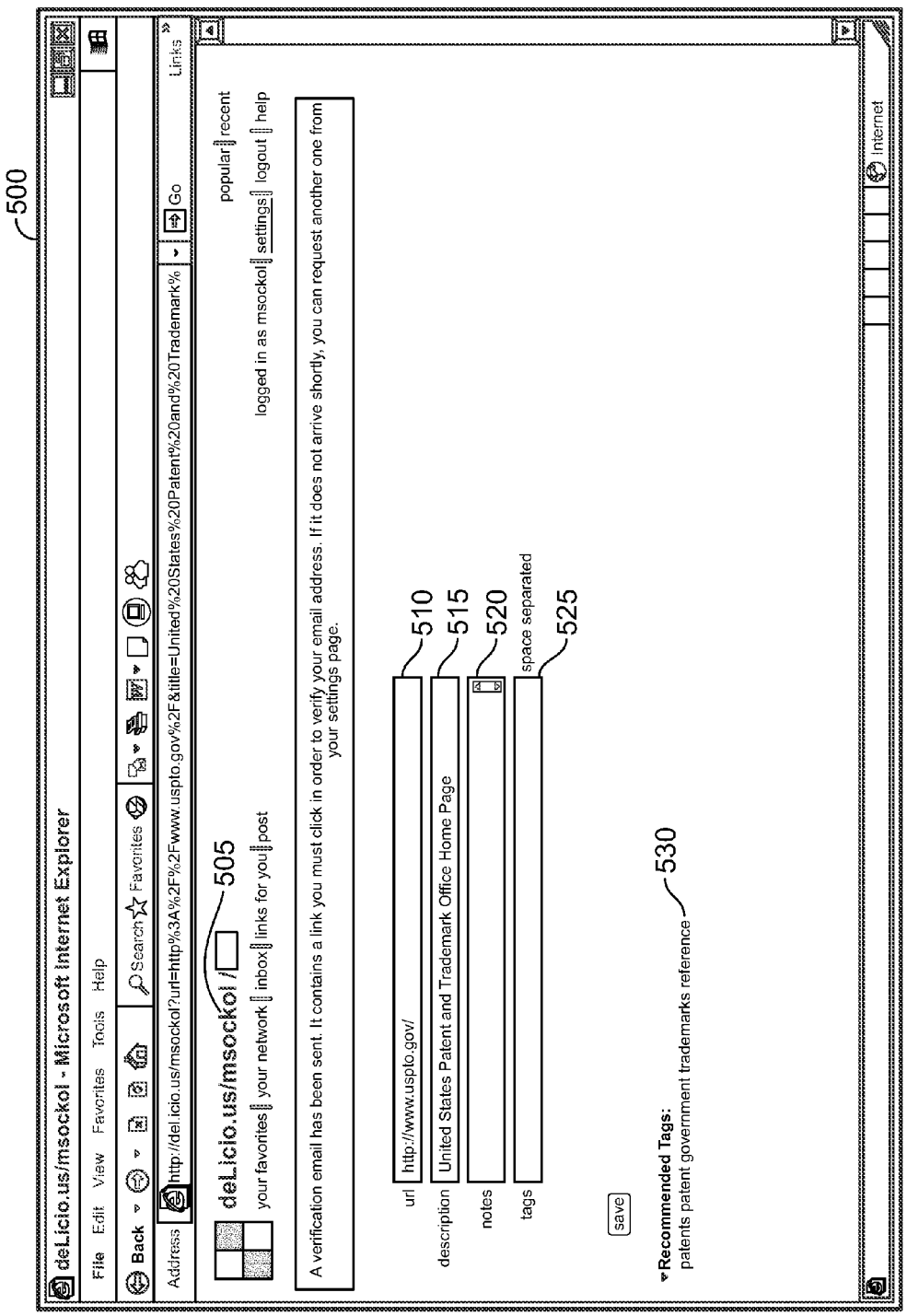
FIG. 5 illustrates an example bookmark packaging form for obtaining a bookmark and meta-information on a bookmark, in accordance with an embodiment of the present invention.

The post manager 205 may include hardware, software and/or firmware for enabling a user to request a reference to a content item to be saved in the bookmark package database 125, for communicating with the user and the other components (elements 210-245) of the bookmark packaging engine 120 to obtain bookmark and meta-information, for packaging the bookmark and meta-information, and for transmitting the bookmark packages to the bookmark package database 125. The post manager 205 may include web server functionality to enable the presentation of a user interface, e.g., the bookmark packaging form 500 shown in FIG. 5, as a website to the user. The post manager 205 may include an application program interface (API) to enable communication with the post bookmark plugin 140 or other plugins or applications. The API may be available to third parties, their applications, and their plugins. For example, the user may navigate to the patent office website, e.g., http://www.uspto.gov/. The user may feel that others may benefit from learning about the existence of the patent office website, and thus may wish to bookmark the patent office website in a publicly available location. In one embodiment, upon deciding to bookmark the patent office website, the user may navigate to the website managed by the post manager 205 and may complete the bookmark packaging form 500 as shown in FIG. 5. In another embodiment, while still at the patent office website, the user may click on a button presented by the post bookmark plugin 140. In response, the post bookmark plugin 140 automatically gathers the bookmark information of the site the user is currently reviewing (e.g., the URL of the patent office website—"http://www.uspto.gov/") and possibly meta-information about the website (e.g., the title of the patent office website—"United States Patent and Trademark Office Home Page"), automatically navigates to the bookmark packaging form 500 as shown in FIG. 5, and automatically fills in the relevant fields with the gathered URL and meta-information. It will be appreciated that the post manager 205 may refuse to post content items or URLs known to be bad.

The URL ID generator 210 includes hardware, software and/or firmware for automatically generating a URL ID based on the URL of interest, and possibly based on other information such as the title. The URL ID generator 210 may use conventional hashing functions to generate the URL ID.

The user ID generator 215 includes hardware, software and/or firmware for automatically generating a user ID based on the user. The user ID generator 215 may generate the user ID during the registration process. Thus, when a user returns to the bookmarking website, the user ID generator 215 may gather the user ID during the login process. Each user preferably has a unique ID.

The post ID generator 220 includes hardware, software and/or firmware for automatically generating a post ID. In one embodiment, the post ID generator 220 numbers the posts in sequential order. Each post will get a unique post ID.

The description interface 225 includes hardware, software and/or firmware for enabling meta-information to be added to a description field of the bookmark packaging form 500. In one embodiment, the description interface 225 automatically enters description information into the description field of the bookmark packaging form 500 as a default, and enables the user to edit the default description information. When operating with the plugin 140, the description interface 225 may receive the description information, e.g., title, from the plugin 140. When not operating with the plugin 140, the description interface 225 may automatically retrieve the description information from the website being bookmarked, enter the retrieved description information into the description field of the bookmark packaging form 500 as a default, and enable the user to edit the information. Alternatively, the description interface 225 starts from a blank field.

The user notes user interface 230 includes hardware, software and/or firmware for enabling the user to enter meta-information to a user notes field of the bookmark packaging form. Whether or not operating with the plugin 140, the user notes user interface 230 in one embodiment may start from a blank field. That is, in one embodiment, the user notes user interface 230 may not automatically enter any default notes.

The tag user interface 235 includes hardware, software and/or firmware for enabling the user to enter tags into a tag field of the bookmark packaging form 500. Whether or not operating with the plugin 140, the tag user interface 230 in one embodiment may start from a blank field. That is, in one embodiment, the tag user interface 230 may not automatically enter any default tags. In another embodiment, the tag user interface 230 may generate a default set of tags, possibly by analyzing the content item, by extracting words from the description and/or user notes, by extracting terms from related bookmarks, etc. The tags may include user-selected keywords or other descriptors and/or system-selected keywords or other descriptors. The tags may be based on specific attributes of the content item such as a file type. The tags may comprise individual keywords and/or groupings of tags.

The automatic meta-information generator 240 includes hardware, software and/or firmware for automatically gathering meta-information about the content item. For example, the automatic meta-information generator 240 may extract meta-information from the URL, from the user, from the host of the content item, from the content of the content item (e.g., using indexing/categorization techniques implemented by conventional web crawling systems), from the file type of the content item, etc.

The keyword cleanup engine 245 includes hardware, software and/or firmware for automatically managing terms of the description, the terms of the user notes, the tags, the automatically generated meta-information, etc. The keyword cleanup engine 245 may collapse versions of words into a single term (e.g., "search", "searches", "searching", and "searchable" into the single term of "search"), may modify punctuation (e.g., change punctuation in the middle of words into an ampersand such as "people's" into "people&s"), may remove punctuation at the beginning and end of words, may add other words (e.g., synonyms, alternate spellings, etc.), etc.

It will be appreciated that the keyword cleanup engine 245 may handle indexing mechanisms in a manner specific to the database. For example, keywords may be divided by purpose into regions (e.g., notes, description, tags, etc.) and separated by a keyword that is not normally searchable (e.g., "_SEP_"). The region separator prevents phrase searches from matching across two or more keyword regions. The search manager's keyword cleanup engine 410 (discussed below with reference to FIG. 4) performs steps to ensure that users may not search for the separator keyword, for example, by removing leading and/or trailing punctuation from the user-entered search terms.

In one embodiment of the present invention, several types of internal meta-information are encoded as keywords that may be used to enhance or limit search results but may not be specified directly by the user.

URL ID (e.g., "_url_id=218527"). This is the unique ID of the URL being indexed. There is one URL ID per index record.

URL IDs in other forms (e.g., "url_md5=7b6cdc20ad985d4ddc547cd18a9e3998"), which are used by other parts of the system to uniquely identify index records by URL. There may be multiple forms of URL ID, each referring to the same URL.

Host ID (e.g., "_host=poe&perl&org" and "_host=perl&org"). These identify the host part of the URL at various levels of specificity in order to limit search results to specific hosts or domains.

POST ID (e.g., "_post_id=553034"). This is the unique ID of the post associated with a URL's index record. Each URL index record contains one or more post IDs. Index records that would have zero post IDs are removed.

User ID (e.g., "_user_id=6564"). This is the unique ID of the user who has bookmarked the associated URL. There is one user ID per post ID.

Tag ID (e.g., "_tag=perl"). Each tag is indexed as a plain-text word and as an internal "tag" meta-information keyword. This allows users to search only the tags without finding incidental words in descriptions, extended text, or elsewhere.

In one embodiment of the present invention, the searchable part of a URL index record (i.e., the "key") may look like this:

_tag=framework_tag=network_tag=perl_tag=poe_tag= programming framework network perl poe programming-_SEP_ _url_id=218527 _url_=md5=7b6cdc20ad985d4ddc547cd18a9e3998_post_id=483157_user_id=656_ post_id=553034_user_id=6116_SEP_ host=poe&perl&org_host=perl&org_SEP_very intriguing event&based perl framework wish i&d had this in 99_SEP_veri intrigue event&bas perl framework wish i&d had this in 99_SEP_multithreading for perl_SEP_multithread for perl Index records may also contain payloads, which are structured data associated with the index record keywords but which are separate from and not indexed with the keywords. Payloads may contain information necessary to produce results in a user interface. However, they may change over time. In one embodiment of the present invention, index record payloads include the following information:

The most popular description for the URL, or a message indicating that nobody has described the URL.

The most popular notes for the URL, or a message indicating that nobody has annotated the URL.

The five most popular tags associated with the URL. Tags are counted across all users who bookmarked the URL, and the five most used ones are chosen. A tag must be used by at least two users to be considered popular. Tags are stored in descending order of popularity.

The number of posts for a given URL.

A map of user IDs to post IDs, so that a particular user's post may be found among all the posts contributing to the URL's keywords.

The URL's ID. The URL's hash ID is included to avoid recalculating it when search results are presented to the user.

Figure 3:
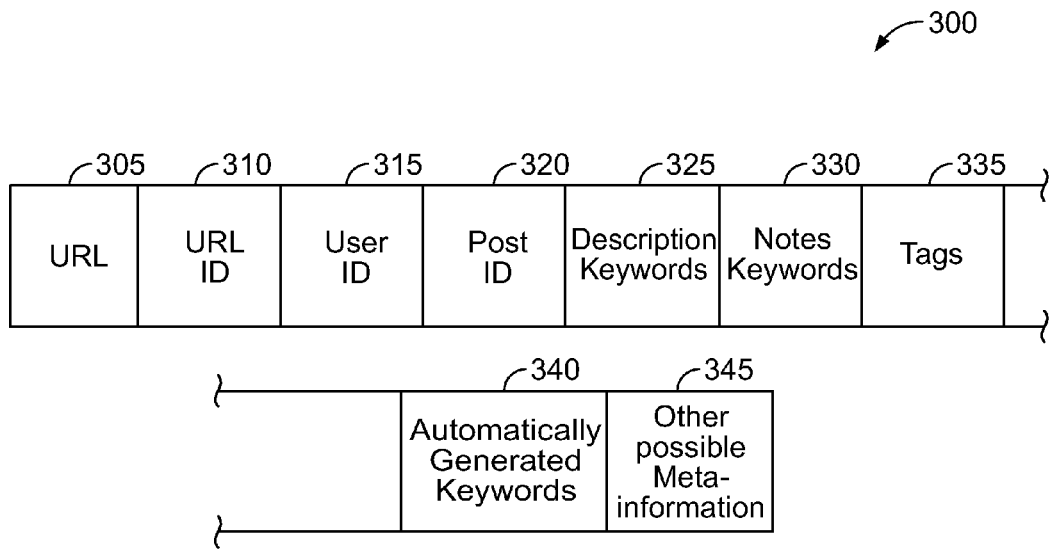
FIG. 3 is a block diagram illustrating the data structure of a bookmark package, in accordance with an embodiment of the present invention.

FIG. 3 is a block diagram illustrating a bookmark package 300 generated by the bookmark packaging engine 120, in accordance with an embodiment of the present invention. The bookmark package 300 includes URL 305, a URL ID 310, a user ID 315 of the user requesting that the bookmark be entered into the database, a post ID 320, description keywords 325, notes keywords 330, tags 335, automatically generated keywords 340, and other possible meta-information 345. It will be appreciated that the bookmark package database 125 will store multiple bookmark packages 300 and other information such as index information.

Figure 4:
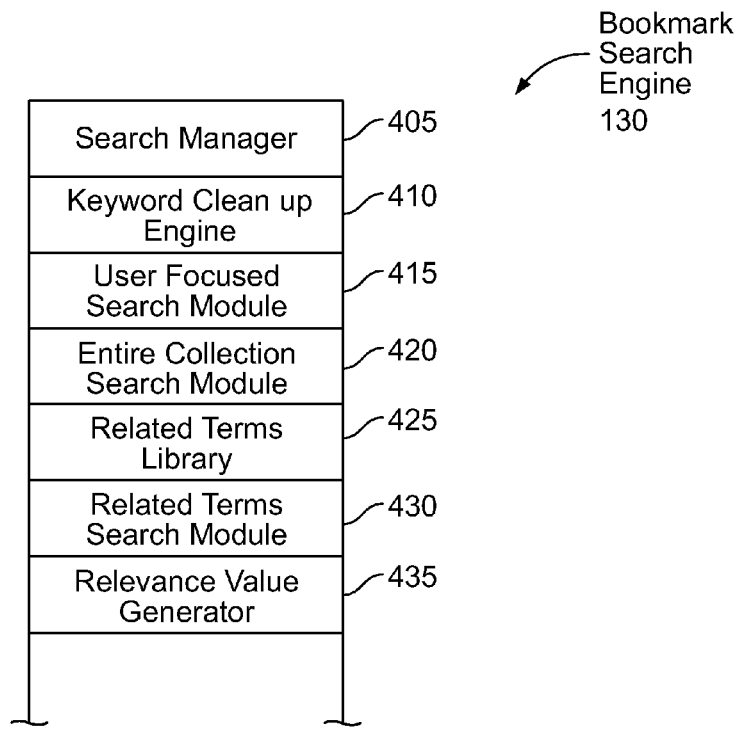
FIG. 4 is a block diagram illustrating details of a bookmark search engine of FIG. 1.

FIG. 4 is a block diagram illustrating details of the bookmark search engine 130. The bookmark search engine 130 includes a search manager 405, a keyword cleanup engine 410, a user-focused search module 415, an entire-collection search module 420, a related terms library 425, a related terms search module 430 and a relevance value generator 435. Each of the components of the bookmark search engine 130 may be capable of communicating with various other components of the system 100, e.g., the client devices 105, the bookmark packaging engine 120, the bookmark package database 125, etc. It will be appreciated that all or a portion of the components of the bookmark search engine 130 may be maintained on the bookmark package database 125.

The search manager 405 includes hardware, software and/or firmware for receiving search requests from users, for communicating with the other search engine components (elements 410-435) to gather search result information, for sorting the search result information based on relevance, and for generating search results for presentation to the requesting users. The search manager 405 may enable the user to use Boolean operators, parentheses, quotation marks, and/or other search mechanisms. The search manager 405 may remove stopwords, e.g., words like "a", "an", "the," etc. In one embodiment, the relative positions of keywords are preserved in the user's query, so that phrases can be found within the index database without regard to the gaps where stopwords lie. For example, a search for "one two and three" may find "one two and three", "one two four three", "one two knickers three", etc. In other words, whatever word appears in the stopword's gap in the index is ignored, as long as "three" is in the fourth position of the phrase.

The keyword cleanup engine 410 includes hardware, software and/or firmware for managing the keywords of the description, the keywords of the user notes, the tags, the meta-information determined automatically, etc., and preferably operates identically to the keyword cleanup engine 245. That is, the keyword cleanup engine 410 may collapse versions of words into a single term (e.g., "search", "searches", "searching", and "searchable" into the single term of "search"), may modify punctuation (e.g., change punctuation in the middle of words into an ampersand such as "people's" into "people&s"), may remove punctuation at the beginning and end of words, may add other words (e.g., synonyms, alternate spellings, etc.), may translate user-friendly query terms into internal metadata terms, such as "tag:poe" into "_tag=poe", etc.

The user-focused search module 415 includes hardware, software and/or firmware for conducting user-specific searches of the bookmark package database 125. That is, when a user conducts a search, e.g., a keyword search, a topic search, or the like, the user-focused search module 415 will identify only the bookmark packages that the user created. In one embodiment, the user-focused search module 415 will conduct the search against only the bookmark packages 300 that have the same user ID as the requesting user. In one embodiment, the user-focused search module 415 sends search requests to the bookmark package database 125, which conducts the actual search, possibly using an inverted index or other indexing technology, such as Xapian (™) software.

The entire collection search module 420 includes hardware, software and/or firmware for conducting searches of the entire bookmark package database 125. That is, when a user conducts a search, e.g., a keyword search, a topic search, or the like, the entire collection search module 420 searches the bookmarks of the entire collection, regardless of the user that created each bookmark package 300. In one embodiment, the entire collection search module 420 sends search requests to the bookmark package database 125, which conducts the actual search, possibly using an inverted index or other indexing technology, such as Xapian software.

The related terms library 425 includes hardware, software and/or firmware for storing related terms. That is, the related terms library 425 may store synonyms, alternate spellings, different tenses, groupings of words that relate to particular topics (e.g., patent, patents, USPTO, intellectual property, etc.), etc. The related terms library 425 may store groupings of terms that relate to a given content item, such as the set of all tags corresponding to a given content item. In one embodiment, the related terms library 425 is stored on the bookmark package database 125.

The related terms search module 430 includes hardware, software and/or firmware for searching the related terms search library 425 for terms that relate to the keywords of a user search request. In one embodiment, the related terms search module 430 provides the related terms to the search manager 405, which in turn communicates with the user-focused search module 415 and the entire collection search module 420 to conduct additional searches of the bookmark package database 125 using the related terms. In one embodiment, the related terms search module 430 provides the related terms to the search manager 405, which provides them as a list to the user (should the user wish to conduct another search of the bookmark package database 125, e.g., by clicking on one or more of the related terms). In one embodiment, the related terms search module 430 sends search requests to the bookmark package database 125, which conducts the actual search, possibly using an inverted index or other indexing technology, such as Xapian software.

The relevance value generator 435 includes hardware, software and/or firmware for generating a relevance value of the bookmarks identified by the various search modules (e.g., search modules 415 and/or 420) and/or in cooperation with the various search modules (e.g., search modules 415 and/or 420) to assist with their determination of relevance. The relevance value generator 435 may determine relevance value based on features such as the number of bookmarks to a given content item, the number of hits on a given bookmark, the order of keywords in the search request, the date and time of the last post to the content item, the date and time of the last hit on a given bookmark, content analysis, etc. The relevance value generator 435 may generate a different relevance value to a keyword match based on whether the keyword match is found in the tag field versus the description field versus the user notes field. For example, the relevance value generator 435 may value a match with a tag greater than a match with a term in the description. Further, the relevance value generator 435 may value a match with a term in the description greater than a match with a term in the user notes. Other relevance value generation techniques or combination of techniques may be used.

It will be appreciated that the search manager 405 may handle search mechanisms in a manner specific to the database being used. In one embodiment, certain words and characters are treated as special by the indexing software, which provides a mechanism for keyword prefixes that can map to metadata. Some prefixes may not be exposed to the user. Rather, they are used internally to augment or limit the user's search. Unknown prefixes may be preserved by mapping them to themselves. This allows unknown prefixes to be treated as literal search text. In one embodiment, prefixes such as "media:" and "filetype:" are preserved this way despite the software's tendency to parse them specially. The preprocessed query and its custom prefixes are passed to the keyword cleanup engine 410 and the rest of the bookmark search engine 130 for subsequent processing.

FIG. 5 illustrates an example bookmark packaging form 500 for gathering a bookmark and meta-information on a bookmark, in accordance with an embodiment of the present invention. The bookmark packaging form 500 displays a username 505 (from which the user ID may be generated), a URL field 510 (including the page being bookmarked by default, the USTPO website in this instance), a description field 515 (including the title of the page being bookmarked by default, the USPTO website title in this instance), a user notes field 520, and a tags field 525. The bookmark packaging form 500 presents a set of "recommended tags 530" that list terms used by others who have previously bookmarked this particular URL. It also may include other sets of tags (e.g., "your tags", the set of tags you have used to bookmark previous URLs).

FIG. 6 illustrates an example user interface 600 for displaying the results of a search of the bookmark package database 125, in accordance with an embodiment of the present invention. User interface 600 provides search results for user 605 ("msockol") in response to a keyword search ("uspto") as shown in the keyword search field 610. The search results include a list of items bookmarked by the user 605 and relevant to the keyword search 610, shown as "Your items" 615. In this illustration, no results were found. The search results also include a list of bookmarks saved by the entire collection of users and relevant to the keyword search, shown in "Everyone's items" 620. "Everyone's items" 620 include 429 related content items in an order corresponding to a relevance value generated by a relevance value generator 435. The search results also include a list of common tags 625 related to the keyword search 610. The list of common tags 625 includes a list of terms generated from the tags corresponding to the list of bookmarks. The list of terms may include only terms having been entered by more than a certain number of people, e.g., more than 5 people, or may include only the terms for the top 10 bookmarks in the list. The list may be ordered based on popularity of the terms. The search results may include other information, such as related terms, bookmark lists generated based on related terms, etc.

Figure 7:
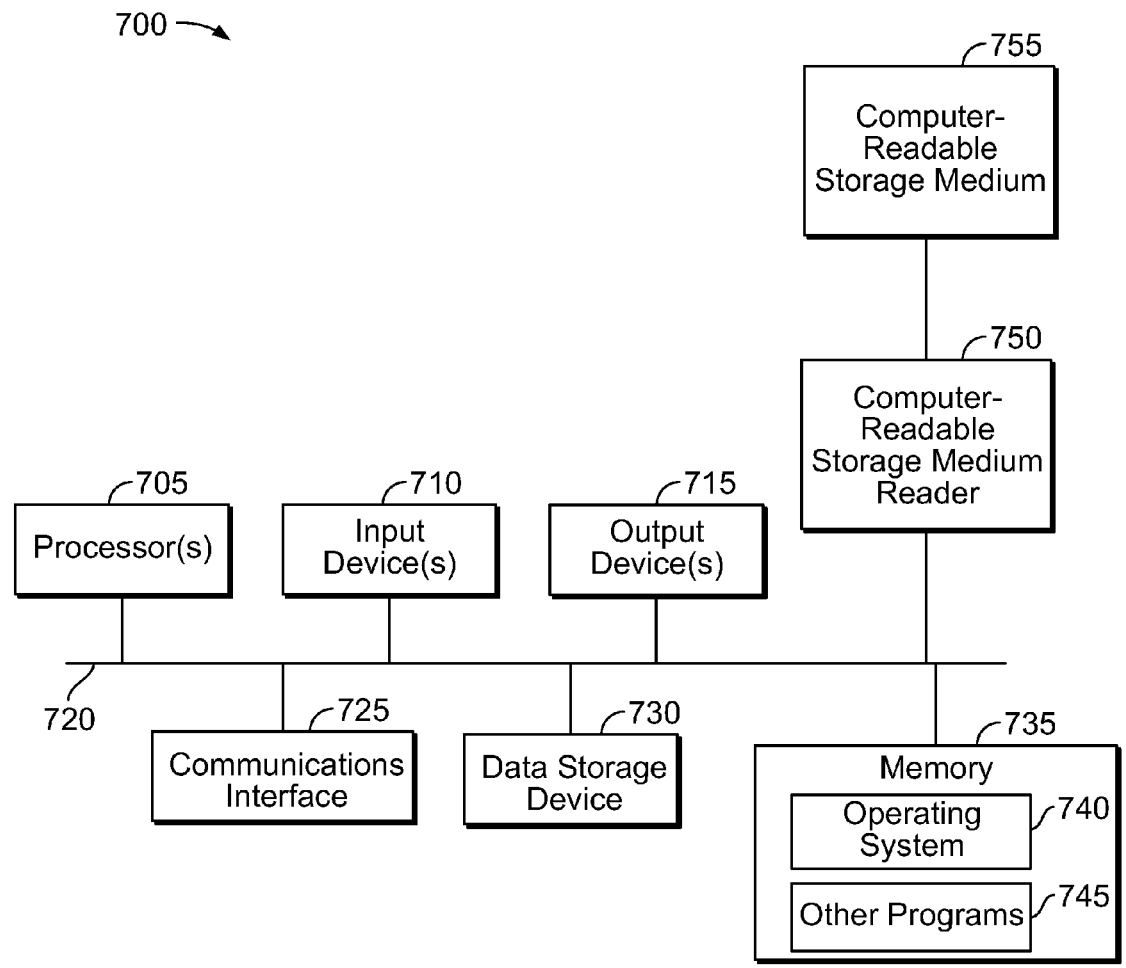
FIG. 7 is a block diagram illustrating details of an example computer system.

FIG. 7 is a block diagram illustrating details of an example computer system 700, of which each client device 105, each content server 115, the bookmark packaging engine 120, the bookmark search engine 130 and the bookmark package database 125 may be an instance. Computer system 700 includes a processor 705, such as an Intel Pentium® microprocessor or a Motorola Power PC® microprocessor, coupled to a communications channel 720. The computer system 700 further includes an input device 710 such as a keyboard or mouse, an output device 715 such as a cathode ray tube display, a communications device 725, a data storage device 730 such as a magnetic disk, and memory 735 such as Random-Access Memory (RAM), each coupled to the communications channel 720. The communications interface 725 may be coupled to a network such as the wide-area network commonly referred to as the Internet. One skilled in the art will recognize that, although the data storage device 730 and memory 735 are illustrated as different units, the data storage device 730 and memory 735 can be parts of the same unit, distributed units, virtual memory, etc.

The data storage device 730 and/or memory 735 may store an operating system 740 such as the Microsoft Windows XP, Linux, the IBM OS/2 operating system, the MAC OS, or UNIX operating system and/or other programs 745. It will be appreciated that a preferred embodiment may also be implemented on platforms and operating systems other than those mentioned. An embodiment may be written using Perl, C, and/or C++ language, or other programming languages, possibly using object oriented or other programming methodologies.

One skilled in the art will recognize that the computer system 700 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 750 such as a magnetic disk drive, hard disk drive, magneto-optical reader, CPU, etc. may be coupled to the communications bus 720 for reading a computer-readable storage medium (CRSM) 755 such as a magnetic disk, a hard disk, a magneto-optical disk, RAM, etc. Accordingly, the computer system 700 may receive programs and/or data via the CRSM reader 750. Further, it will be appreciated that the term "memory" herein is intended to cover all data storage media whether permanent or temporary.

Figure 8:
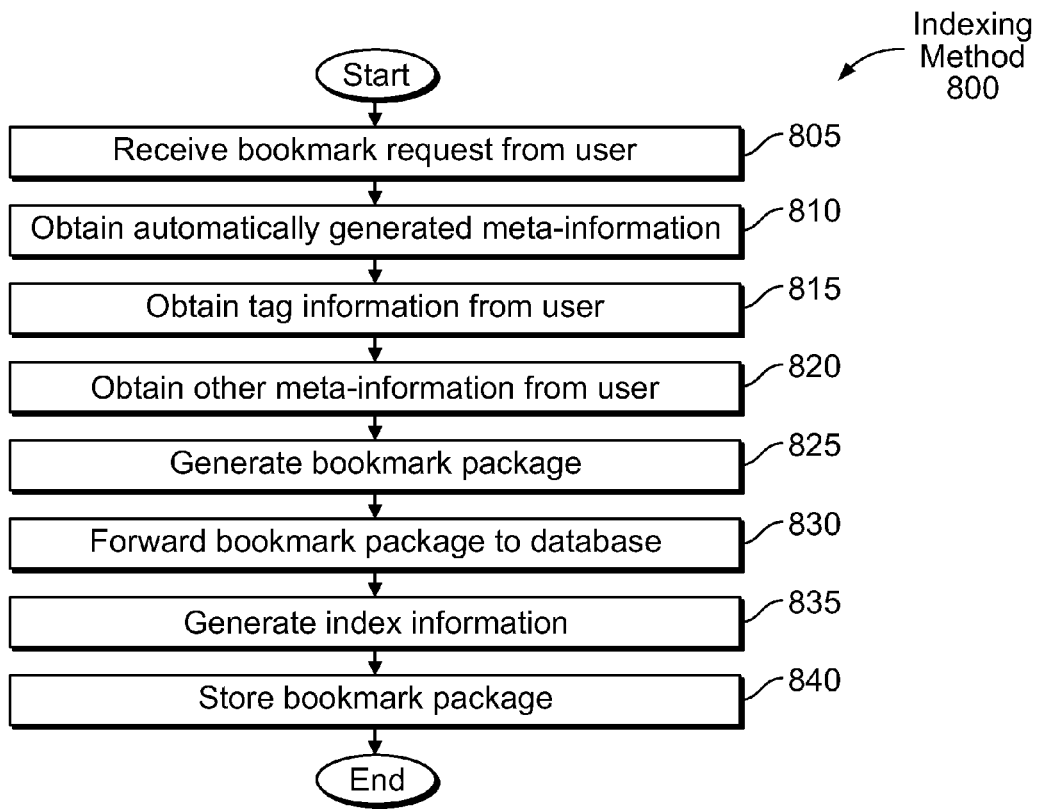
FIG. 8 is a flowchart illustrating a method of packaging and indexing a bookmark, in accordance with an embodiment of the present invention.

FIG. 8 is a flowchart illustrating a method 800 of indexing a bookmark, in accordance with an embodiment of the present invention. Method 800 begins in step 805 with the post manager 205 receiving a bookmark request for a given content item. In step 810, the post manager 205 obtains automatically generated meta-information from automatic generators. For example, the post manager 205 may obtain a URL ID from the URL ID generator 210, a user ID from the user ID generator 215, a post ID from the post ID generator 220, and other meta-information (e.g., keywords in the content item, host information, URL information, etc.) from another automatic meta-information generator 240. The post manager 205 may obtain description information from the description interface 225. As stated above, all or a portion of the description information may be generated automatically. In step 815, the post manager 205 obtains tag information from the tag user interface 235. In step 820, the post manager 205 obtains other meta-information from the user, e.g., from the user notes user interface 230, from the description interface 225, etc.

In step 825, the post manager 205 generates a bookmark package 300. In one embodiment, the post manager 205 operates with the keyword cleanup engine 245 to modify the meta-information, e.g., the terms of the tags, the terms of the description, the terms of the user notes, etc. Such modifications may include modifying punctuation, collapsing words, etc. In step 830, the post manager 205 forwards the bookmark package to the bookmark package database 125. The bookmark package database 125 in step 835 generates index information, e.g., generates tag spaces, bookmark spaces, term spaces, etc., and in step 840 stores the bookmark package (and any index information). Method 800 then ends.

Figure 9:
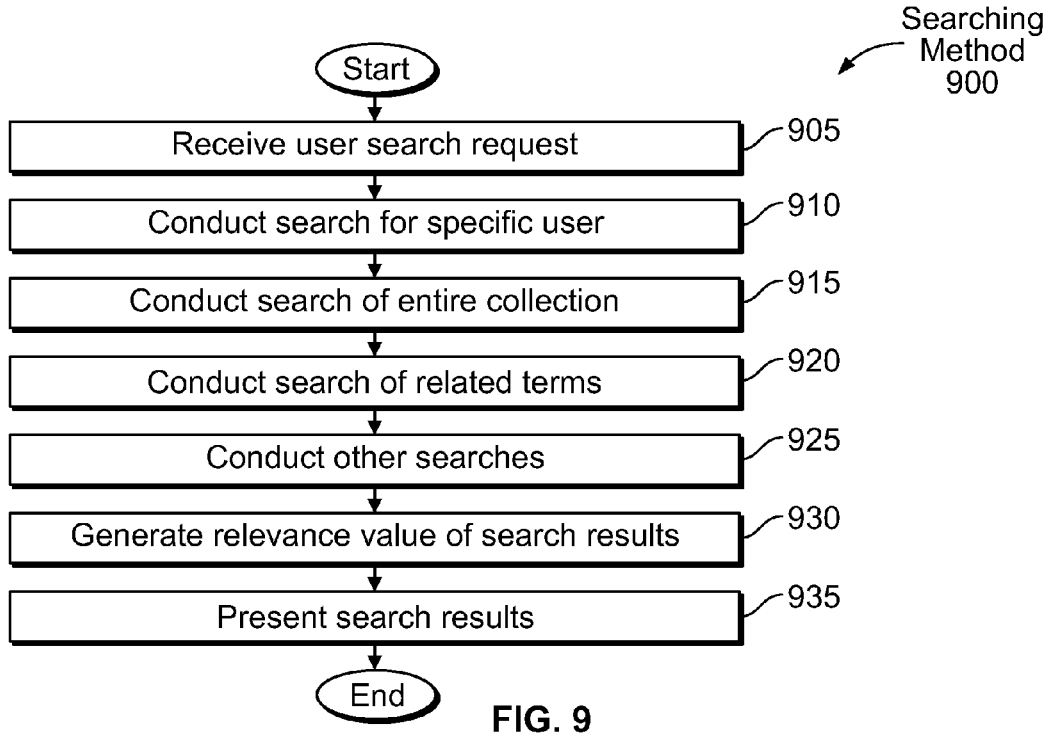
FIG. 9 is a flowchart illustrating a method of searching a bookmark package database, in accordance with an embodiment of the present invention.

FIG. 9 is a flowchart illustrating a method 900 of searching the bookmark package database 125, in accordance with an embodiment of the present invention. Method 900 begins in step 905 with the search manager 405 receiving a user search request and possibly using the keyword cleanup engine 410 to modify the keywords of the search request (possibly in an identical process as implemented during the packaging process by the keyword cleanup engine 245). In step 910, the search manager 405 cooperates with the user-focused search module 415 to conduct a search for bookmarks related to the search request and posted by the particular user. In step 915, the search manager 405 cooperates with the entire collection search module 420 to conduct a search for the bookmarks related to the search request, regardless of the user that posted the bookmark. In step 920, the search manager 405, possibly in cooperation with the related terms library 425 and/or the related terms search module 430, conducts a search for related search terms. The related search terms may be related based on known relatedness (such as synonyms, antonyms, alternative spellings, same root, etc.) and/or based on tag relatedness (e.g., other users have marked the same content item with other tag terms). Known relatedness and tag relatedness may overlap in all or in part. In step 925, the search manager 405, possibly in cooperation with the user-focused search module 415 and/or the entire collection search module 420, conducts any additional searches based on the related terms. In step 930, the search manager 405 generates a relevance value for each bookmark of the search results. In one embodiment, step 930 occurs in cooperation with step 910 and/or step 915. In step 935, the search manager 405 presents the search results to the user, possibly in the order based on the relevance values of the bookmark packages. Method 900 then ends.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:
1. A method, comprising:
  storing a plurality of bookmark packages associated with a plurality of users in a bookmark package database on a computer readable medium, each bookmark package containing a searchable index portion and a payload portion wherein the index portion stores meta-information including tag information specified by the users, a uniform resource locator (URL) identifier, and a user identifier that identifies each of the bookmarks as belonging to at least one of the users, and wherein the payload portion is not indexed, stores structured data associated with the index portion and contains information that changes over time, and wherein the payload portion comprises a most popular description associated with the URL, responsive to determining that a popular description associated with the URL exists, most popular notes associated with the URL, responsive to determining that popular notes exist, a plurality of popular tags associated with the URL, a number of posts for a given URL, a map of user IDs associated with the posts, and a URL ID;
  receiving from a first user a search request to search a bookmark package database, the bookmark package database storing bookmarks for the first user and a plurality of other users;

using the search request to search the index portion of the bookmark packages to locate relevant bookmarks and to generate search results;

generating, using a processing device, a relevance value for each of the bookmarks, the relevance value indicating a relevance of the bookmark to the search request, the relevance value based on the position of the search query terms within the index portion of the bookmarked packages; and presenting the search results comprising a set of relevant bookmarks to a user based on the relevance values of the bookmarks, the set of relevant bookmarks comprising at least two separate lists comprising a first list consisting of the first user's relevant bookmarks and a second list consisting of the plurality of other user's relevant bookmarks.

2. The method of claim 1, wherein the search request includes a set of keywords.

3. The method of claim 1, wherein the tag information associated with at least one of the bookmarks in the database includes at least one user-selected tag presented to at least one of the users as a recommended tag while bookmarking a URL, the recommended tag generated from tags in the bookmark package database specified by other users while bookmarking a URL.

4. The method of claim 1, wherein the list of the first user's relevant bookmarks and the list of the other user's bookmarks are each sorted based on relevance to the search request.

5. The method of claim 1, further comprising identifying the relevant bookmarks regardless of the user that created them.

6. The method of claim 1, further comprising generating a list of related terms and enabling the user to select from the related terms to initiate additional searching of the bookmark package database, the list of related terms comprises a plurality of tags from within the bookmark package database that are associated with the relevant bookmarks presented to the first user sorted by popularity of the tags among the relevant bookmarks presented to the first user.

7. The method of claim 1, wherein the relevance value is based on at least one of keyword order, type of meta-information, number of bookmarks to a given content item, number of hits on a given bookmark, time of the last post of a bookmark to a given content item, and content analysis.

8. The method of claim 1, wherein the bookmark package database further stores automatically generated meta-information and user-generated meta-information.

9. A system, comprising:

a processor;

a bookmark package database connected to the processor storing a plurality of bookmark packages for a plurality of users in a bookmark package database on a computer readable medium, each bookmark package containing a searchable index portion and a payload portion wherein the index portion stores meta-information including tag information specified by the users, a uniform resource locator (URL) identifier, and a user identifier that identifies each of the bookmarks as belonging to at least one of the users, and wherein the payload portion is not indexed, stores structured data associated with the index portion and contains information that changes over time, and wherein the payload portion comprises a most popular description associated with the URL, responsive to determining that a popular description associated with the URL exists, most popular notes associated with the URL, responsive to determining that popular notes exist, a plurality of popular tags associated with the URL, a number of posts for a given URL, a map of user IDs associated with the posts, and a URL ID;

a search manager, executed on a processing device, operative to receive a search request to search the index portion of the bookmark package database including the tag information in the bookmark package database and to present search results to a user;

a relevance value generator, executed on the processing device, operative to generate a relevance value for each of the bookmarks, the relevance value based on the position of the search query terms within the index portion of the bookmarked packages; and a search module coupled to the search manager, executed on a second processing device, operative to use the search request to search the tag information in the bookmark package database to locate relevant bookmarks and to generate the search results, wherein the search manager:

presents the search results comprising a set of relevant bookmarks to the user based on the relevance values of the bookmarks, the set of relevant bookmarks comprising at least two separate lists comprising a first list consisting of the first user's relevant bookmarks and a second list consisting of the plurality of other user's relevant bookmarks.

10. The system of claim 9, wherein the search request includes a set of keywords.

11. The system of claim 9, wherein the tag information associated with at least one of the bookmarks in the database includes at least one user-selected tag presented to at least one of the users as a recommended tag while bookmarking a URL, the recommended tag generated from tags in the bookmark package database specified by other users while bookmarking a URL.

12. The system of claim 9, wherein the list of the first user's relevant bookmarks and the list of the other user's bookmarks are each sorted based on relevance to the search request.

13. The system of claim 9, further comprising an entire collection search module for identifying the relevant bookmarks regardless of the user that created them.

14. The system of claim 9, further comprising a related terms search module for generating a list of related terms, wherein the search manager is configured to enable the user to select from the related terms to initiate additional searching of the bookmark package database, the list of related terms comprises a plurality of tags from within the bookmark package database that are associated with the relevant bookmarks presented to the first user sorted by popularity of the tags among the relevant bookmarks presented to the first user.

15. The system of claim 9, wherein the relevance value generator is configured to generate the relevance value based on at least one of keyword order, type of meta-information, number of bookmarks to a given content item, number of hits on a given bookmark, time of the last post of a bookmark to a given content item, and content analysis.

16. The system of claim 9, wherein the bookmark package database further stores automatically generated meta-information and user-generated meta-information.

17. Computer readable storage media comprising program code that when executed by a programmable processor causes the programmable processor to execute a method for searching for relevant bookmarks, the computer readable media comprising:

program code for storing a plurality of bookmark packages associated with a plurality of users in a bookmark package database on a computer readable medium, each bookmark package containing a searchable index portion and a payload portion wherein the index portion stores meta-information including tag information specified by the users, a uniform resource locator (URL) identifier, and a user identifier that identifies each of the bookmarks as belonging to at least one of the users, and wherein the payload portion is not indexed, stores structured data associated with the index portion and contains information that changes over time, and wherein the payload portion comprises a most popular description associated with the URL, responsive to determining that a popular description associated with the URL exists, most popular notes associated with the URL, responsive to determining that popular notes exist, a plurality of popular tags associated with the URL, a number of posts for a given URL, a map of user IDs associated with the posts, and a URL ID;

program code stored on a physical storage device for receiving from a first user a search request to search a bookmark package database, the bookmark package database storing bookmarks for the first user and a plurality of other users and internal meta-information comprising a plurality of fields, including tag information specified by the users, a uniform resource locator (URL) identifier, and a user identifier, wherein the user identifier identifies each of the bookmarks as belonging to at least one of the users, and wherein the internal meta-information is associated with each bookmark;

program code stored on a physical storage device for using the search request to search the index portion of the bookmark package database including the tag information in the bookmark package database to locate relevant bookmarks and to generate search results;

program code stored on a physical storage device for generating a relevance value for each of the bookmarks, the relevance value indicating a relevance of the bookmark to the search request, the relevance value based on the position of the search query terms within the index portion of the bookmarked packages; and program code stored on a physical storage device for presenting the search results comprising a set of relevant bookmarks to a user based on the relevance values of the bookmarks, the set of relevant bookmarks comprising at least two separate lists comprising a first list consisting of the first user's relevant bookmarks and a second list consisting of the plurality of other user's relevant bookmarks.

* * * * *